United States Patent [19]
Allen et al.

[11] Patent Number: 5,807,153
[45] Date of Patent: Sep. 15, 1998

[54] ICE RESCUE VEHICLE

[75] Inventors: Charles E. Allen; Brian J. Watrous, both of Ledyard, Conn.

[73] Assignee: Ice Rescue Vehicle, Inc., Branford, Conn.

[21] Appl. No.: 890,967

[22] Filed: Jul. 10, 1997

Related U.S. Application Data

[60] Provisional application No. 60/021,555, Jul. 11, 1996.
[51] Int. Cl.⁶ ........................................................ B63C 9/32
[52] U.S. Cl. ................................................. 441/82; 440/98
[58] Field of Search ................................ 440/98, 100, 90; 441/80, 82; 180/180, 194, 196

[56] References Cited

U.S. PATENT DOCUMENTS

| | | |
|---|---|---|
| 1,259,470 | 3/1918 | Avoscan . |
| 2,812,737 | 11/1957 | Hoover . |
| 3,190,255 | 6/1965 | Olson . |
| 3,266,453 | 8/1966 | Fonda . |
| 3,651,880 | 3/1972 | Hatch et al. . |
| 4,717,362 | 1/1988 | Kraft . |
| 4,990,114 | 2/1991 | LeBlanc, Jr. ............................. 441/80 |
| 5,427,557 | 6/1995 | Lunden, Sr. . |
| 5,624,292 | 4/1997 | Wiseman, Jr. ............................. 441/80 |

*Primary Examiner*—Ed L. Swinehart
*Attorney, Agent, or Firm*—Richard C. Litman

[57] ABSTRACT

An ice rescue vehicle used to aid a victim who has fallen through thin ice. The ice rescue vehicle is capable of traveling over ice, water, a broken ice and water mixture, mud, snow and solid ground. The vehicle has a buoyant hollow sled pulled behind a traction wheel that includes a plastic, buoyant, rotating drum. The drum has a number of fins to propel the vehicle in water. Mounted to the fins are three annular rings having tangs for traction on ice. A small internal combustion engine provides power to turn the drum via two gear belt drives on each side of the drum. Handle bars are used to steer the vehicle, and a throttle control, similar to those used on motorcycles, provides the rescuer with a means to control the engine and vehicle speed. The sled and drum both provide flotation during travel over broken ice and open water.

17 Claims, 5 Drawing Sheets

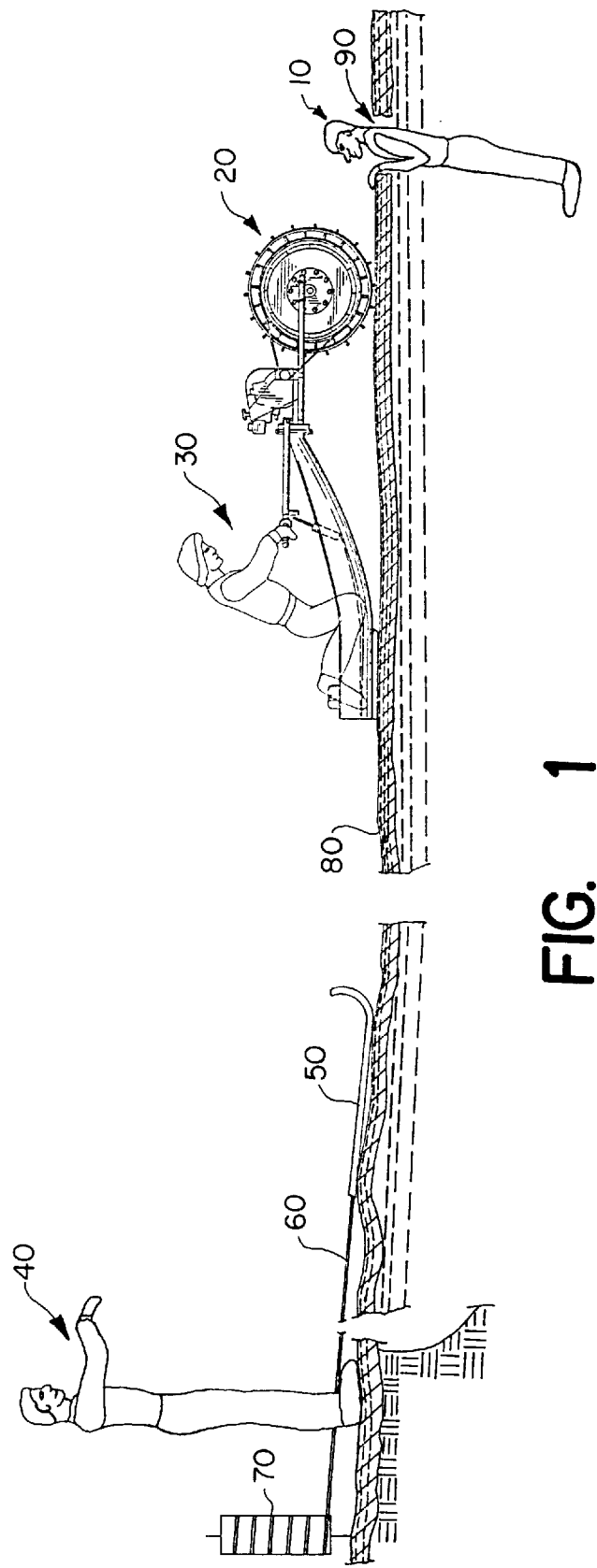

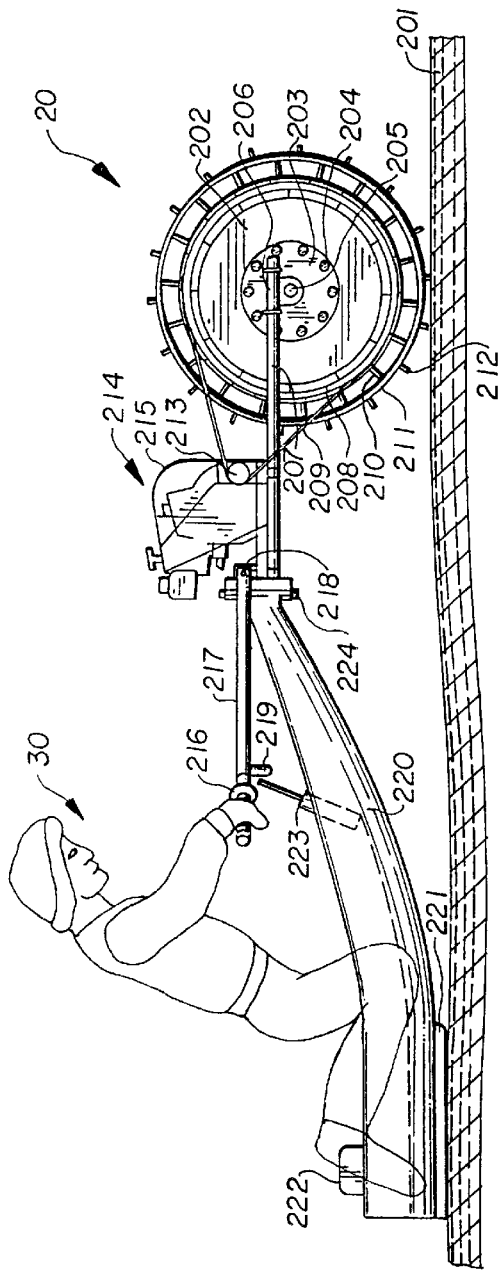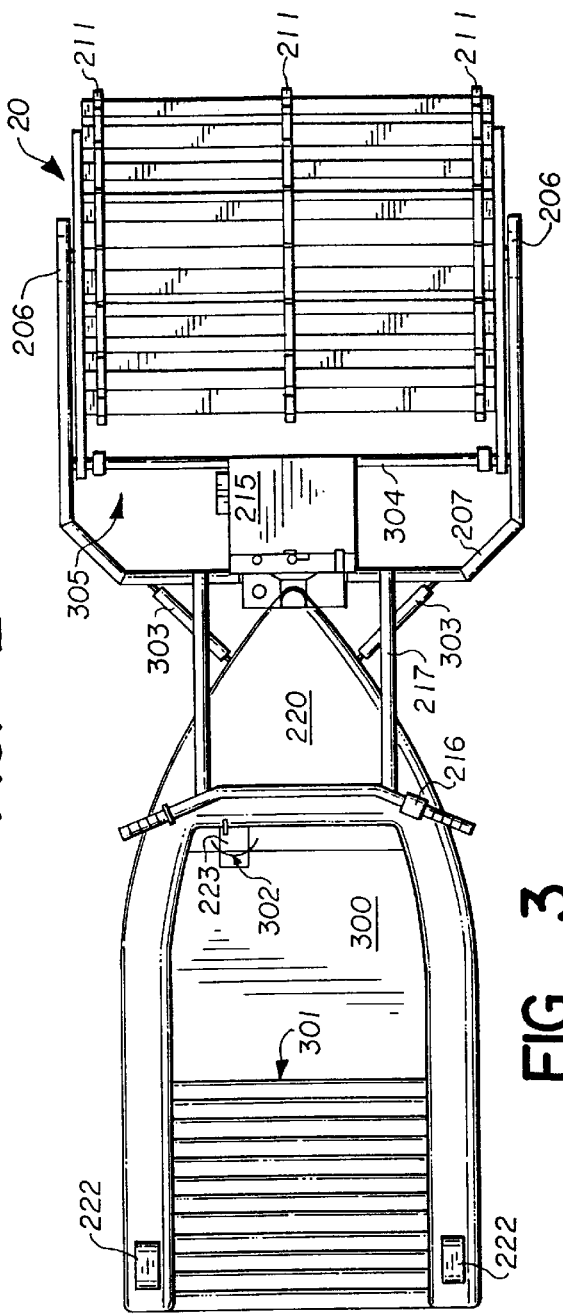

ICE RESCUE VEHICLE

CROSS-REFERENCE TO RELATED APPLICATION

This application claims the benefit of U.S. Provisional patent application Ser. No. 60/021,555, filed Jul. 11, 1996.

BACKGROUND OF THE INVENTION

1. FIELD OF THE INVENTION

The present invention relates to a vehicle capable of traveling over ice and water primarily intended for use during ice rescue situations.

2. DESCRIPTION OF PRIOR ART

In an ice rescue situation, where a person has fallen through an ice sheet, the most important aspect is getting a rope to the victim. However, the very nature of the ice sheet, e.g. slippery and fragile, often prevents all but the most specialized of craft or technically equipped individuals from reaching the victim. This in part due to the combination of elements such a craft must traverse, namely intermittent stretches of liquid water and solid water (ice), mud, etc.

Vehicles designed to travel over ice and water capable of reaching a victim are known. For example, U.S. Pat. No. 5,427,557, (Lunden, Sr.), discloses a self-propelled ice rescue device that has a floatable base platform propelled over ice and/or water by two paddle wheels. U.S. Pat. No. 4,717,362, (Kraft), discloses a lifesaving craft comprising a flat bottomed buoyant, non-motorized, sled-like structure with handles to assist a person who has fallen through the ice to pull onto the craft. U.S. Pat. No. 3,190,255, (Olson), discloses a combination outboard motor and sled driving means having a paddle wheel driven by an internal combustion engine and further having spikes on the paddle wheel for traction on ice. U.S. Pat. No. 1,259,470, (Avoscan), discloses a motorized wheel for skaters that uses a tire provided with points or projections to pull a non-buoyant sled over ice.

Other specialized craft directed at other uses on water and land are also known. U.S. Pat. No. 2,812,737 (Hoover), discloses a marsh boat having a buoyant portion propelled by a chain driven paddle wheel. The paddle wheel has spikes that assist in travel over dry land, and the chain is driven by an internal combustion engine. U.S. Pat. No. 3,266,453, (Fonda), discloses a motorized pack carrier having an internal combustion engine driving a chain driven, buoyant, drive wheel including fins for propelling the carrier over snow, soft ground and water. Tread rings are attached to the fins for travel over dry land. U.S. Pat. No. 3,651,880, (Hatch et al.), discloses a passenger-carrying vehicle having a single, large, drum-shaped, rear-mounted driving wheel that is driven by an internal combustion engine via a chain.

None of the above inventions and patents, taken either singly or in combination, is seen to describe the instant invention as claimed.

SUMMARY OF THE INVENTION

The present invention is an ice rescue vehicle that is capable of traveling over ice, water, a broken ice and water mixture, mud, snow and solid ground. The vehicle has a buoyant hollow sled pulled behind a traction wheel that includes a plastic, buoyant, rotating drum. A small internal combustion engine provides power to the drum via two gear belt drives on each side of the drum. Handle bars are used to steer the vehicle, and a throttle control, similar to those used on motorcycles, provides the rescuer with a means to control the engine and vehicle speed. The sled and drum provide flotation during travel over broken ice and open water.

Attached to the cylindrical outer surface of the drum are a number of fins. The fins are radially attached about the drum using nuts and bolts, the fins thereby disposed to act as paddles when the vehicle travels over water. Three annular rings are circumferentially attached about the fins at each end and the middle of the drum. Attached to the rings are outwardly extending tangs that provide traction for the drum while traveling over ice, broken ice, snow, mud and solid ground. The vehicle is seven and one half feet long from the front of the drum to the end of the sled. At the highest point, the vehicle is 29 inches high. The weight of the vehicle is approximately 115 lbs, making it easy to handle by two men.

Accordingly, it is a principal object of the invention to provide an ice rescue vehicle that can transport a rescuer quickly to a victim or animal over any combination of ice, water, snow, mud, dry land, and broken ice.

It is another object of the invention to provide an ice rescue vehicle that is economical, lightweight and compact.

These and other objects of the present invention will become readily apparent upon further review of the following specification and drawings.

BRIEF DESCRIPTION OF THE DRAWINGS

FIG. 1 is an environmental, elevational view of the ice rescue vehicle according to the present invention pulling a rescue sled and crossing an ice-covered body of water to perform a rescue.

FIG. 2 is a side elevational view of the ice rescue vehicle in use by a driver.

FIG. 3 is a top plan view of the ice rescue vehicle.

Similar reference characters denote corresponding features consistently throughout the attached drawings.

DETAILED DESCRIPTION OF THE PREFERRED EMBODIMENT

Figure 4:
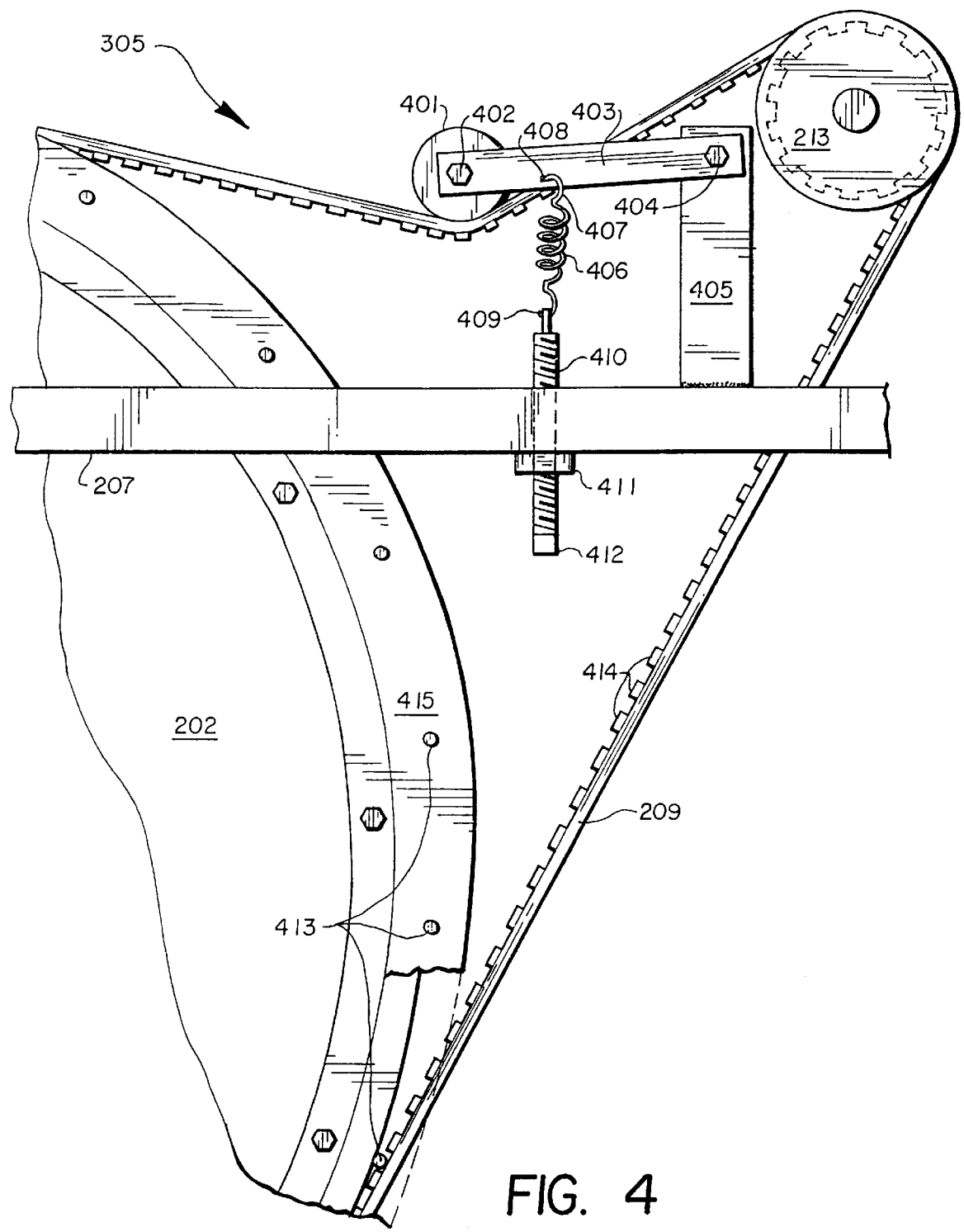
FIG. 4 is a fragmented left side view of the gear belt drive system of the ice rescue vehicle.

The present invention is an ice rescue vehicle used to assist victims or animals in ice related emergencies. FIG. 1 shows a typical ice rescue situation. A victim 10 or animal, after falling through thin ice, remains stuck in hole 90. The present invention, ice rescue vehicle 20, is shown operated by a rescuer 30 to reach the victim or animal and allow the rescuer to hand the victim a rope, or administer other aid. The ice rescue vehicle 20 travels easily over a broken ice and water surface 80. A rescue sled 50 may also be towed to the victim using the ice rescue vehicle 20. To rescue the victim, a rope 60 and winding mechanism 70 are utilized by an on shore rescuer 40 to return the rescue sled 50 to shore after the victim 10 has been placed thereupon.

Details of the ice rescue vehicle 20 are best seen by referring to FIGS. 2 and 3, including generally a buoyant propulsion and traction wheel, a buoyant passenger area, and a tubular frame attaching the passenger area to the wheel and supporting a motor. In FIG. 2, the right side of the ice rescue vehicle 20 is shown with a rescuer 30, in a kneeling position, or, preferably, in a prone position so as to spread his or her weight over a greater surface of the passenger area, driving the vehicle over an ice surface 201.

The buoyant propulsion and traction wheel includes a sealed plastic drum 202 for providing buoyancy; the drum 202 is generally cylindrical, having a left and right side wall (the right wall being shown in FIG. 2). A shaft (not shown) passes between each wall, there further being a plastic plate 203 attached to each wall to support the shaft, and a number of bolts 204 acting as fasteners to rigidly fix the plates and shaft to the drum 202. A bearing 205 receiving the shaft and permitting rotation of the shaft and drum assembly is attached to a bracket 206 affixed to each frame member 207 of the frame.

Radially attached to the outer cylindrical surface of the drum are a number of fins 210 for propelling the vehicle through water. Circumferentially attached to the outer edges of the fins 210 are three traction rings 211, having a plurality of radially, outwardly projecting tangs 212 for providing traction on ice and slippery surfaces.

To rotate the propulsion and traction wheel, an internal combustion engine 214 is operably mounted to the frame. The internal combustion engine 214 is provided with a cover 215 to keep water, ice and dirt from fouling the engine. The engine 214 generates torque which is transferred by two belts 209 to two pin-gear wheels 208 provided at each end of the drum 202. More specifically, each belt 209 is driven by two drive gears 213, in turn regulated by a centrifugal clutch (not shown) linked to the drive gears by a series of connecting members later described, in turn torqued by the internal combustion engine 214.

The buoyant passenger area comprises a sled portion 220 which is attached to the frame using a vertical pivot 224. When the rescue vehicle 20 is not in use, the sled portion 220 can removed from the frame by means of the vertical pivot 224 by quick-disconnect means well known in the art. However, more importantly, the pivot 224 allows the vehicle to be steered. The rescuer 30 steers the vehicle by pushing the handlebars 217 of the frame in a direction opposite the desired direction of travel, thereby allowing the sled portion 220 to act as a rudder relative to the propulsion and traction wheel.

For ease of use, handlebars 217 are connected to the frame using a horizontal pivot 218 to allow the handlebars to be moved up and down. A throttle control 216 is provided on the handlebars 217 which allows the rescuer 30 to hand-control the engine, similar to a motorcycle throttle, the control 216 being linked to the engine 214 via a cable assembly (not shown). Stops 219 provided on the handlebars 217 limit the downward movement of the handlebars to avoid pinching of the rescuer's; fingers between the handlebars and the sled portion 220. Means for foldably mounting the handlebars to frame may also be included for purposes of compact storage and handling when the rescue vehicle is not in use.

To hold the direction of travel of the sled portion 202 straight during propulsion, yet in a relaxed position to allow ruddering when the rescuer actively turns the handlebars, a pair of stiffly elastic bands 303 are provided, each attached laterally of the sled portion 202 between the sled portion 202 and frame member 207. These elastic bands limit fish-tailing of the rescue vehicle 20.

The bottom of the sled portion 202 includes runners 221, for stable movement over sheet ice. The top surface of the sled has a hollow area 300 in which a rescuer may sit, kneel or lay, preferably prone to distribute weight evenly across the sled portion and limit break-through of sheet ice, while driving the vehicle. The hollow area 300 includes a number of raised ridges 301 for increased friction between the rescuer and the sled portion 202. Raised areas or rails 222 are provided on each side of the sled to help prevent the rescuer from sliding off the side of the sled. A holder 302 is mounted on the front of the hollow area 300, to keep a hand-held radio 223 in easy reaching distance of the rescuer.

Figure 5:
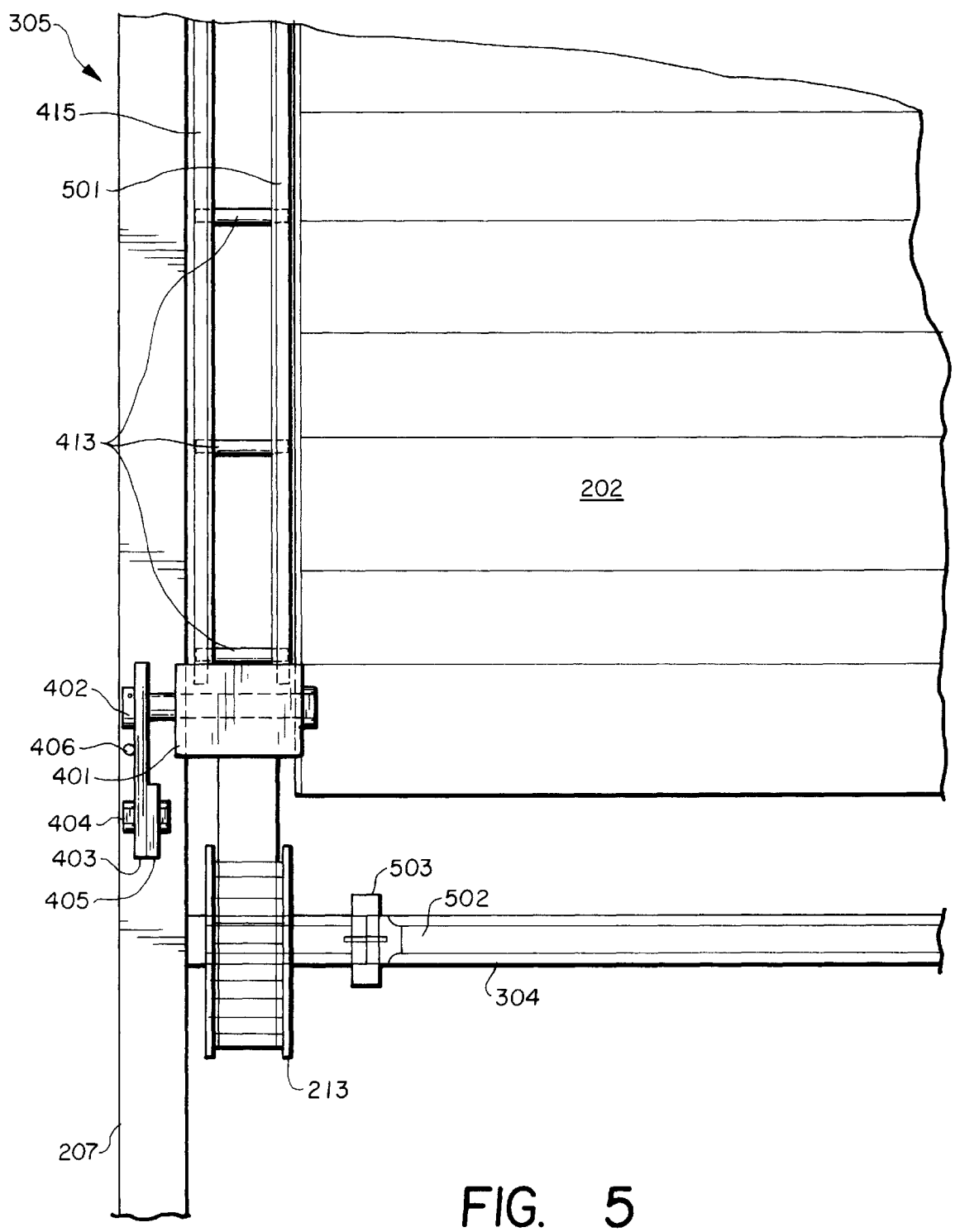
FIG. 5 is a fragmented top view of the gear belt drive system of the ice rescue vehicle.

Details of the left side of traction wheel showing the gear belt drive 305 are shown in FIGS. 4 and 5, with the right side of the traction wheel essentially being a mirror image thereof. The internal combustion engine 214 of FIG. 3 is supported by the frame, including frame member 304. A drive shaft 502 rotationally and concentrically passes through supporting frame member 304, which is attached to engine 214. A drive shaft linkage, not shown, may include an assembly including a sprocket attached to drive shaft 502 and chain, the chain driven by a centrifugal clutch torqued by engine 214. Bearing 503 is provided at each end of the drive shaft 502 to allow the shaft 502 to rotate concentrically within the frame member 304. Likewise, a third middle bearing (not shown) rotatably secures the drive shaft 502 in a centered position on frame member 304. A drive gear 213 is attached to the end of each drive shaft 502 to drive each belt 209, the drive belts each having teeth 414 dimensioned and configured to engage both the mating cogs (shown in phantom lines) on drive gears 213 and the drive pins 413.

Attached to the circumference of each side wall of drum 202 is an inner annular plate 501 defining a series of holes (not numbered) each accepting a drive pin 413. An outer annular plate 415 is spaced apart and in parallel to inner annular plate 501, the outer annular plate 415 also defining a series of holes each of which are aligned in registry and receiving a drive pin 413 mounted in a hole of inner annular plate 501. This arrangement thereby forms the pin-gear wheels 208.

The gear belt drive 305 also includes a belt tensioning arrangement. A lever support arm 405 is attached to frame member 207. From the lever support arm 405, a lever arm 403 is pivotally mounted at its proximate end by means of a pivot bolt 404. A roller bearing 401 is rotatably mounted by bolt 402 to the lever arm 403 on its distal end and is engaged with belt 209. A hole 408, positioned in the lever arm 403 between the proximate and distal ends, receives a spring 406 by means of a first hook 407. A second hook 409 of spring 406 is mounted in a hole at first end of threaded tensioning bolt 410 extending through frame member 207. A matingly threaded nut 411 limits the upward movement of the tensioning bolt by abutting frame member 207.

Each belt's; tension can be adjusted by altering the position of the nut 411 relative to the bolt 410, thereby changing the tension exerted by the spring 406 against the lever arm 403 and in turn against the belt 209. A tool engagement surface 412 is provided at a second end of the tensioning bolt 410 by which to hold the bolt as nut 411 as it is turned to adjust the tension in spring 406. The tool engagement surface 412 is either hex shaped, for engagement by a socket or wrench, or is a slot arrangement, for engagement by a flat tip or Phillips screw driver.

Figure 6:
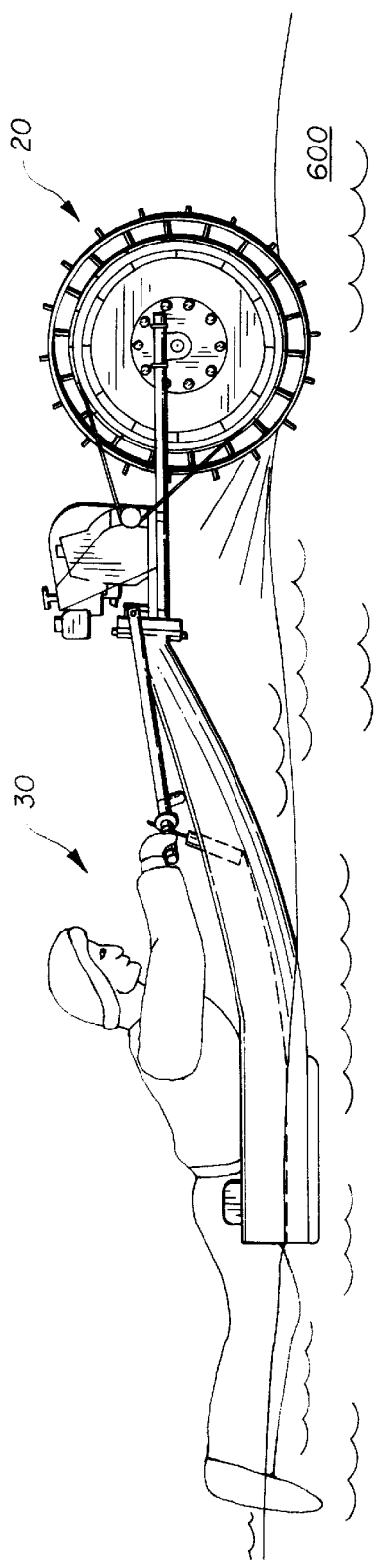
FIG. 6 is a side elevational view of the ice rescue vehicle in use on the surface of water.
Figure 7:
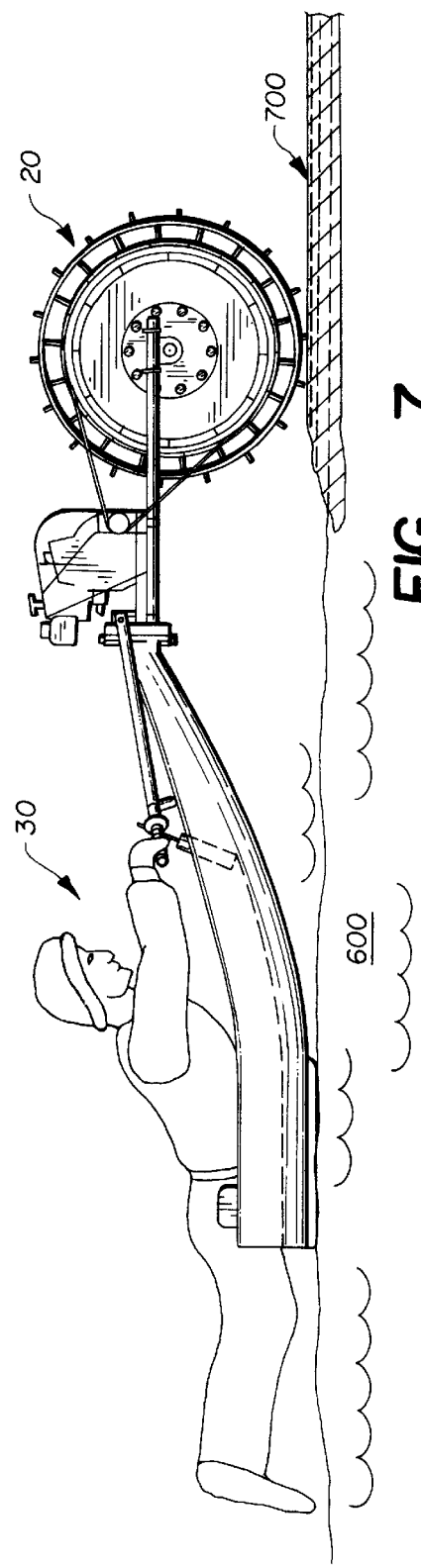
FIG. 7 is a side elevational of the ice rescue vehicle in use in a transition zone between the water and the ice sheet.

Finally, FIG. 6 and FIG. 7 represent the use of the rescue vehicle 20 under various conditions. FIG. 6 shows a side elevational view of the ice rescue vehicle 20 being driven by a rescuer 30 in a prone position. The ice rescue vehicle 20 is propelled as the drum 202 rotates by the fins 210 on the traction wheel as the vehicle traverses open water 600. Although FIG. 7 also shows a side elevational of the ice rescue vehicle 20 being driven by a rescuer 30 in a prone position, the vehicle is in a transition zone between open water 600 and an ice sheet 700. The tangs of the traction rings dig into the ice to provide traction on the surface of the ice sheet 700, while the buoyancy of the sled keeps rescuer 30 predominately out of the water 600.

It is to be understood that the present invention is not limited to the embodiment described above, but encompasses any and all embodiments within the scope of the following claims.

We claim:

1. An ice rescue vehicle comprising:
    a frame, having an front end and a rear end, comprising a plurality of frame members;
    handlebars;
    a first pivoting means for allowing vertical angular motion of said handlebars relative to said frame and pivotally linking said handlebars proximate said rear end of said frame in a generally horizontal plane;
    a buoyant traction wheel rotatably attached proximate said front end of said frame, said buoyant traction wheel comprising
        a buoyant drum having a cylindrical outer surface, a first end wall and a second end wall;
        a plurality of fins radially depending from said outer surface, and
        a pin-gear wheel circumferentially attached about at least one of said first end wall and said second end wall;
    an internal combustion engine mounted on said frame for rotating said traction wheel and operably linked to said pin-gear wheel;
    a buoyant sled portion; and
    a second pivoting means for allowing horizontal angular motion of said sled portion relative to said frame, said sled portion pivotally linked proximate said rear end of said frame in a generally horizontal plane;
    whereby said ice rescue vehicle is steered by a passenger of said sled portion by pivoting said frame employing said handlebars, thereby causing said traction wheel to change its forward direction of travel relative to said sled portion by turning about said second pivoting means, the change in direction thereby causing a ruddering effect.

2. The ice rescue vehicle according to claim 1, further comprising a plurality of annular rings circumferentially attached about said plurality of fins, said annular rings each having a plurality of outwardly extending tangs for providing traction between said traction wheel and a contacting surface.

3. The ice rescue vehicle according to claim 1, wherein said pin-gear wheel has a number of drive pins, and
    further comprising a drive assembly operably linking said pin-gear wheel to said internal combustion engine, said drive assembly including:
        a drive shaft having a first end and a second end, said drive shaft operably linked to said internal combustion engine;
        a first bearing and a first drive gear having a plurality of cogs, each mounted proximate said second end; and
        at least one drive belt having a plurality of teeth engaging said cogs of said first drive gear.

4. The ice rescue vehicle according to claim 3, further comprising a drive belt tensioning arrangement including:
    a lever support arm mounted to said frame;
    a lever arm having a distal end portion and a proximate end portion pivotally mounted to said lever support arm;
    a spring having a first end attached to said frame and a second end attached said lever arm between said distal end portion and said proximate end portion; and
    a roller bearing rotatably mounted to said distal end and contacting said drive belt; whereby said spring biases said lever toward said frame, causing said roller bearing to contact said drive belt and thereby maintain tension on said drive belt.

5. The ice rescue vehicle according to claim 4, wherein said spring is mounted to said frame by means of tensioning bolt and nut assembly depending from said first end of said spring to said frame, said tensioning bolt and nut assembly including a threaded bolt, having a spring end and a nut end, and a matingly threaded nut, wherein said frame includes a hole for passage of said tensioning bolt, said tensioning bolt passing through said hole and both said spring end and said nut end extending through beyond said frame, said first end of said spring mounted onto said spring end, said nut being threadedly mounted on said nut end, whereby the tension maintained in said belt is adjusted by rotating said nut relative to said tensioning bolt thereby changing the tension in said spring.

6. The ice rescue vehicle according to claim 5, wherein said tensioning bolt has a tool engagement surface on said nut end for holding said tensioning bolt stationary while said nut is rotated.

7. The ice rescue vehicle according to claim 6, wherein said tool engagement surface is hex shaped for engagement by a wrench or socket tool.

8. The ice rescue vehicle according to claim 6, wherein said tool engagement surface is a slot arrangement for engagement by a flat-tip or Phillips-head screw driver.

9. The ice rescue vehicle according to claim 4, wherein a first pin-gear wheel is mounted circumferentially about said first end wall and a second pin-gear wheel is mounted circumferentially about said second end wall;
    wherein said first end of said drive shaft includes a first bearing and first drive gear and said second end of said drive shaft includes a second bearing and a second drive gear;
    wherein a first drive belt operably connects said first pin-gear wheel and said first drive gear and a second drive belt operably connects said second pin-gear wheel and said second drive gear; and
    wherein a first drive belt tensioning arrangement maintains tension on said first drive belt and a second drive belt tensioning arrangement maintains tension on said second drive belt.

10. The ice rescue vehicle according to claim 1, wherein said internal combustion engine includes an engine cover for protecting the engine.

11. The ice rescue vehicle according to claim 1, wherein said sled includes a hollow area dimensioned and configured for receiving a prone individual.

12. The ice rescue vehicle according to claim 11, wherein said hollow area includes a number of raised ridges for increased grip between an individual and the sled portion.

13. The ice rescue vehicle according to claim 11, wherein said hollow area includes a holder for a retaining a hand-held radio.

14. The ice rescue vehicle according to claim 1, wherein said sled portion has two rails for preventing the driver from sliding off of the sled portion.

15. The ice rescue vehicle according to claim 1, wherein said sled portion includes runners for stable movement over ice.

16. The ice rescue vehicle according to claim 3, wherein said internal combustion engine includes a centrifugal clutch and said drive shaft is driven by said centrifugal clutch, said drive shaft extending concentrically through one of said plurality of frame members.

17. The ice rescue vehicle according to claim 1, wherein said vehicle further comprises means for foldably mounting said handlebars and means for quick-disconnect attachment of said sled portion to said frame, whereby both said means promote compact storage and handling of said rescue vehicle when not in use.

* * * * *